US012024903B2

(12) United States Patent
Cook et al.

(10) Patent No.: US 12,024,903 B2
(45) Date of Patent: *Jul. 2, 2024

(54) LOOSEFILL INSULATION BLOWING MACHINE

(71) Applicant: Owens Corning Intellectual Capital, LLC, Toledo, OH (US)

(72) Inventors: David M. Cook, Granville, OH (US); Christopher M. Relyea, Marysville, OH (US); Brandon Robinson, Sylvania, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/124,396

(22) Filed: Mar. 21, 2023

(65) Prior Publication Data

US 2023/0228103 A1 Jul. 20, 2023

Related U.S. Application Data

(63) Continuation of application No. 16/783,576, filed on Feb. 6, 2020, now Pat. No. 11,634,915, which is a (Continued)

(51) Int. Cl.

*E04F 21/08* (2006.01)
*B02C 18/08* (2006.01)

(Continued)

(52) U.S. Cl.

CPC ............ *E04F 21/085* (2013.01); *B02C 18/08* (2013.01); *B02C 18/22* (2013.01);

(Continued)

(58) Field of Classification Search

CPC .................. E04F 21/085; B02C 18/08; B02C 2018/0046; B02C 23/20

(Continued)

(56) References Cited

U.S. PATENT DOCUMENTS 6,092,747 A * 7/2000 Gerber .................. B65G 53/66 241/47
7,284,715 B2 * 10/2007 Dziesinski ............ B02C 18/148 241/36

(Continued)

FOREIGN PATENT DOCUMENTS

WO WO-2011075129 A1 * 6/2011 ......... B02C 18/2216

*Primary Examiner* — Bobby Yeonjin Kim
*Assistant Examiner* — Jared O Brown
(74) *Attorney, Agent, or Firm* — MacMillan, Sobanski & Todd, LLC

(57) ABSTRACT

A machine for distributing material from a package of compressed loosefill insulation material is provided. The machine includes a lower unit having a front panel. A shredding chamber is bounded on one side by the front panel and the shredding chamber receives compressed loosefill insulation material from a source of compressed loosefill insulation material. The shredding chamber including a plurality of shredders for shredding, picking apart, and conditioning the loosefill insulation material. A discharge mechanism is mounted to receive the conditioned loosefill insulation material exiting the shredding chamber and to distribute the conditioned loosefill insulation material into an airstream. A removable front access assembly covers a portion of the front panel of the lower unit and includes a control panel having a plurality of control devices. Removal of the removable front access assembly makes the plurality of shredders and the discharge mechanism within the lower unit accessible for inspection, replacement, or repair.

10 Claims, 10 Drawing Sheets

Related U.S. Application Data continuation of application No. 15/266,418, filed on Sep. 15, 2016, now Pat. No. 10,669,727.

(60) Provisional application No. 62/219,418, filed on Sep. 16, 2015.

(51) Int. Cl.
*B02C 18/22* (2006.01)
*B02C 23/20* (2006.01)
*B02C 25/00* (2006.01)

(52) U.S. Cl.
CPC ...... *B02C 18/2216* (2013.01); *B02C 18/2291* (2013.01); *B02C 23/20* (2013.01); *B02C 25/00* (2013.01)

(58) Field of Classification Search
USPC .............................................................. 241/60
See application file for complete search history.

(56) References Cited

U.S. PATENT DOCUMENTS

| | | | | |
|---|---|---|---|---|
| 9,457,355 | B2 * | 10/2016 | Conrad | B02C 23/18 |
| 11,634,915 | B2 * | 4/2023 | Cook | B02C 23/20<br>241/60 |
| 2011/0214278 | A1 * | 9/2011 | Evans | E04F 21/085<br>29/434 |
| 2017/0028405 | A1 * | 2/2017 | Klem | B02C 23/16 |

* cited by examiner

LOOSEFILL INSULATION BLOWING MACHINE

BACKGROUND

When insulating buildings and installations, a frequently used insulation product is loosefill insulation material. In contrast to the unitary or monolithic structure of insulation materials formed as batts or blankets, loosefill insulation material is a multiplicity of discrete, individual tufts, cubes, flakes or nodules. Loosefill insulation material is usually applied within buildings and installations by blowing the loosefill insulation material into an insulation cavity, such as a wall cavity or an attic of a building. Typically loosefill insulation material is made of glass fibers although other mineral fibers, organic fibers, and cellulose fibers can be used.

Loosefill insulation material, also referred to as blowing wool, is typically compressed in packages for transport from an insulation manufacturing site to a building that is to be insulated. Typically the packages include compressed loosefill insulation material encapsulated in a bag. The bags can be made of polypropylene or other suitable material. During the packaging of the loosefill insulation material, it is placed under compression for storage and transportation efficiencies. Typically, the loosefill insulation material is packaged with a compression ratio of at least about 10:1.

The distribution of loosefill insulation material into an insulation cavity typically uses an insulation blowing machine that conditions the loosefill insulation material to a desired density and feeds the conditioned loosefill insulation material pneumatically through a distribution hose. Insulation blowing machines typically contain one or more motors configured to drive shredding mechanisms, rotary valves and discharge mechanisms. The motors, shredding mechanisms, rotary valves and discharge mechanisms often operate at elevated sound levels.

It would be advantageous if insulation blowing machines could be improved.

SUMMARY

The above objects as well as other objects not specifically enumerated are achieved by a machine for distributing loosefill insulation material from a package of compressed loosefill insulation material. In one embodiment, the machine includes a lower unit having a front panel. A shredding chamber is bounded on one side by the front panel and the shredding chamber receives compressed loosefill insulation material from a source of compressed loosefill insulation material. The shredding chamber including a plurality of shredders for shredding, picking apart, and conditioning the loosefill insulation material. A discharge mechanism is mounted to receive the conditioned loosefill insulation material exiting the shredding chamber and to distribute the conditioned loosefill insulation material into an airstream. A removable front access assembly covers a portion of the front panel of the lower unit and includes a control panel having a plurality of control devices. Removal of the removable front access assembly makes the plurality of shredders and the discharge mechanism within the lower unit accessible for inspection, replacement, or repair.

In another embodiment, the machine includes a lower unit having a front panel. A shredding chamber is bounded on one side by the front panel and the shredding chamber receives compressed loosefill insulation material from a source of compressed loosefill insulation material. The shredding chamber including a plurality of shredders for shredding, picking apart, and conditioning the loosefill insulation material. A discharge mechanism is mounted to receive the conditioned loosefill insulation material exiting the shredding chamber and to distribute the conditioned loosefill insulation material into an airstream. A removable front access assembly covers a portion of the front panel of the lower unit and includes at least a screen or a filter. Removal of the removable front access assembly makes the plurality of shredders and the discharge mechanism within the lower unit accessible for inspection, replacement, or repair. Various objects and advantages of the loosefill insulation blowing machine will become apparent to those skilled in the art from the following detailed description of the preferred embodiment, when read in light of the accompanying drawings.

DETAILED DESCRIPTION OF THE INVENTION

Figure 1:
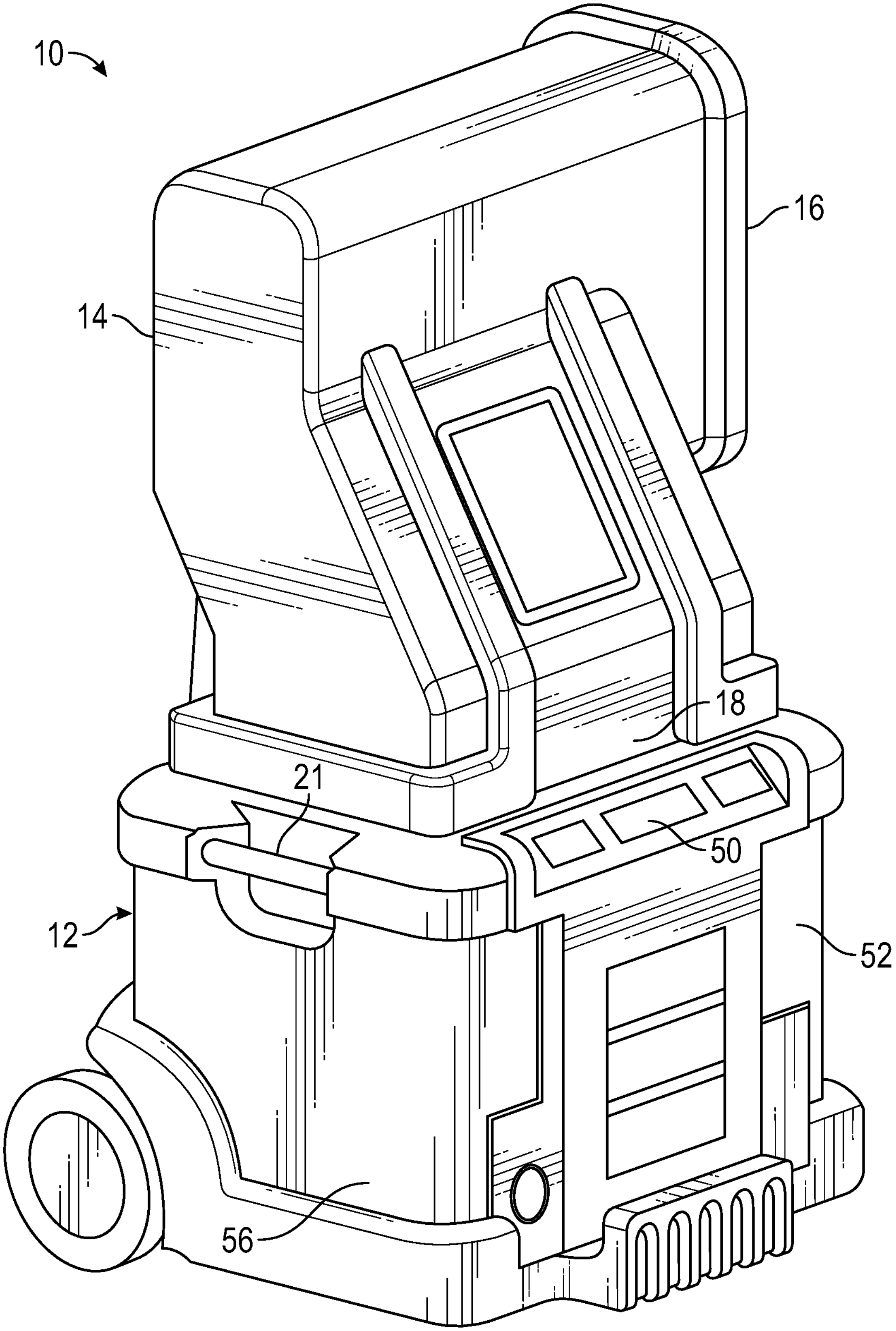
FIG. 1 is a front perspective view of a loosefill insulation blowing machine.

The loosefill insulation blowing machine will now be described with occasional reference to the specific embodiments of the loosefill insulation blowing machine. The loosefill insulation blowing machine may, however, be embodied in different forms and should not be construed as limited to the embodiments set forth herein. Rather, these embodiments are provided so that this disclosure will be thorough and complete, and will fully convey the scope of the loosefill insulation blowing machine to those skilled in the art.

Unless otherwise defined, all technical and scientific terms used herein have the same meaning as commonly understood by one of ordinary skill in the art to which the loosefill insulation blowing machine belongs. The terminology used in the description of the loosefill insulation blowing machine herein is for describing particular embodiments only and is not intended to be limiting of the loosefill insulation blowing machine. As used in the description of the loosefill insulation blowing machine and the appended claims, the singular forms “a,” “an,” and “the” are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term “about.” Accordingly, unless otherwise indicated, the numerical properties set forth in the specification and claims are approximations that may vary depending on the desired properties sought to be obtained in embodiments of the loosefill insulation blowing machine. Notwithstanding that the numerical ranges and parameters setting forth the broad scope of the loosefill insulation blowing machine are approximations, the numerical values set forth in the specific examples are reported as precisely as possible. Any numerical values, however, inherently contain certain errors necessarily resulting from error found in their respective measurements.

In accordance with the illustrated embodiments, the description and figures disclose a loosefill insulation blowing machine. The loosefill insulation blowing machine includes a plurality of shredders configured to shred, pick apart and condition the loosefill insulation material thereby forming conditioned loosefill insulation material. The shredders include a plurality of vane assemblies, with the vane assemblies oriented such that adjacent vane assemblies are offset from each other by an angle of 60°. The loosefill insulation blowing machine also includes an electric motor configured to drive the shredders. The electric motor is enclosed within a motor enclosure and the motor enclosure configured to receive an airflow for cooling the electric motor. The loosefill insulation blowing machine further includes a removable front access assembly configured to cover a portion of a front panel of the lower unit and further configured for removal from the lower unit, thereby making components located in the lower unit visible. The loosefill insulation blowing machine also includes a blower configured to provide the airstream flowing through the discharge mechanism. The blower includes a blower motor configured for variability in a rotational speed of the blower such as to provide a low velocity airstream configured for removing stray fibers from the unwanted locations.

The term “loosefill insulation”, as used herein, is defined to mean any insulating materials configured for distribution in an airstream. The term “finely conditioned”, as used herein, is defined to mean the shredding, picking apart and conditioning of loosefill insulation material to a desired density prior to distribution into an airstream.

Referring now to FIGS. 1-4, a loosefill insulation blowing machine (hereafter “blowing machine”) is shown generally at 10. The blowing machine 10 is configured for conditioning compressed loosefill insulation material and further configured for distributing the conditioned loosefill insulation material to desired locations, such as for example, insulation cavities. The blowing machine 10 includes a lower unit 12 and a chute 14. The lower unit 12 is connected to the chute 14 by one or more fastening mechanisms (not shown) configured to readily assemble and disassemble the chute 14 to the lower unit 12. The chute 14 has an inlet end 16 and an outlet end 18.

Referring again to FIGS. 1-4, the inlet end 16 of the chute 14 is configured to receive compressed loosefill insulation material. The compressed loosefill insulation material is guided within the interior of the chute 14 to the outlet end 18, wherein the loosefill insulation material is introduced to a shredding chamber 23 as shown in FIG. 3.

Referring again to FIGS. 1, 2 and 4, optionally the lower unit 12 can include one or more handle segments 21, configured to facilitate ready movement of the blowing machine 10 from one location to another. However, it should be understood that the one or more handle segments 21 are not necessary to the operation of the blowing machine 10.

Referring again to FIGS. 1-4, the chute 14 can include an optional bail guide (not shown for purposes of clarity) mounted at the inlet end 16 of the chute 14. The bail guide is configured to urge a package of compressed loosefill insulation material against an optional cutting mechanism (also not shown for purposes of clarity) as the package of compressed loosefill insulation material moves further into the chute 14. The bail guide and the cutting mechanism can have any desired structure and operation.

Figure 2:
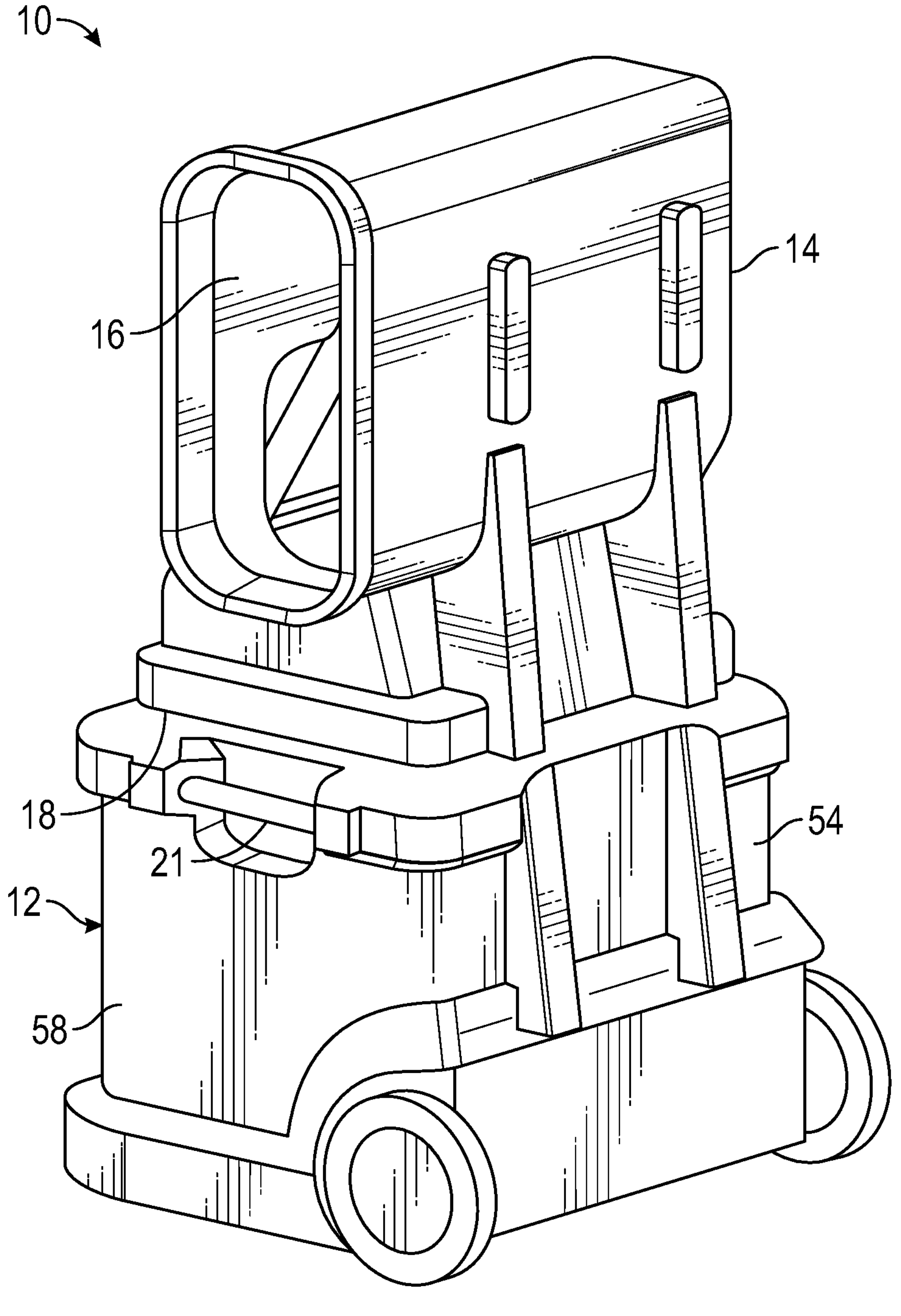
FIG. 2 is a rear perspective view of the loosefill insulation blowing machine of FIG. 1.
Figure 3:
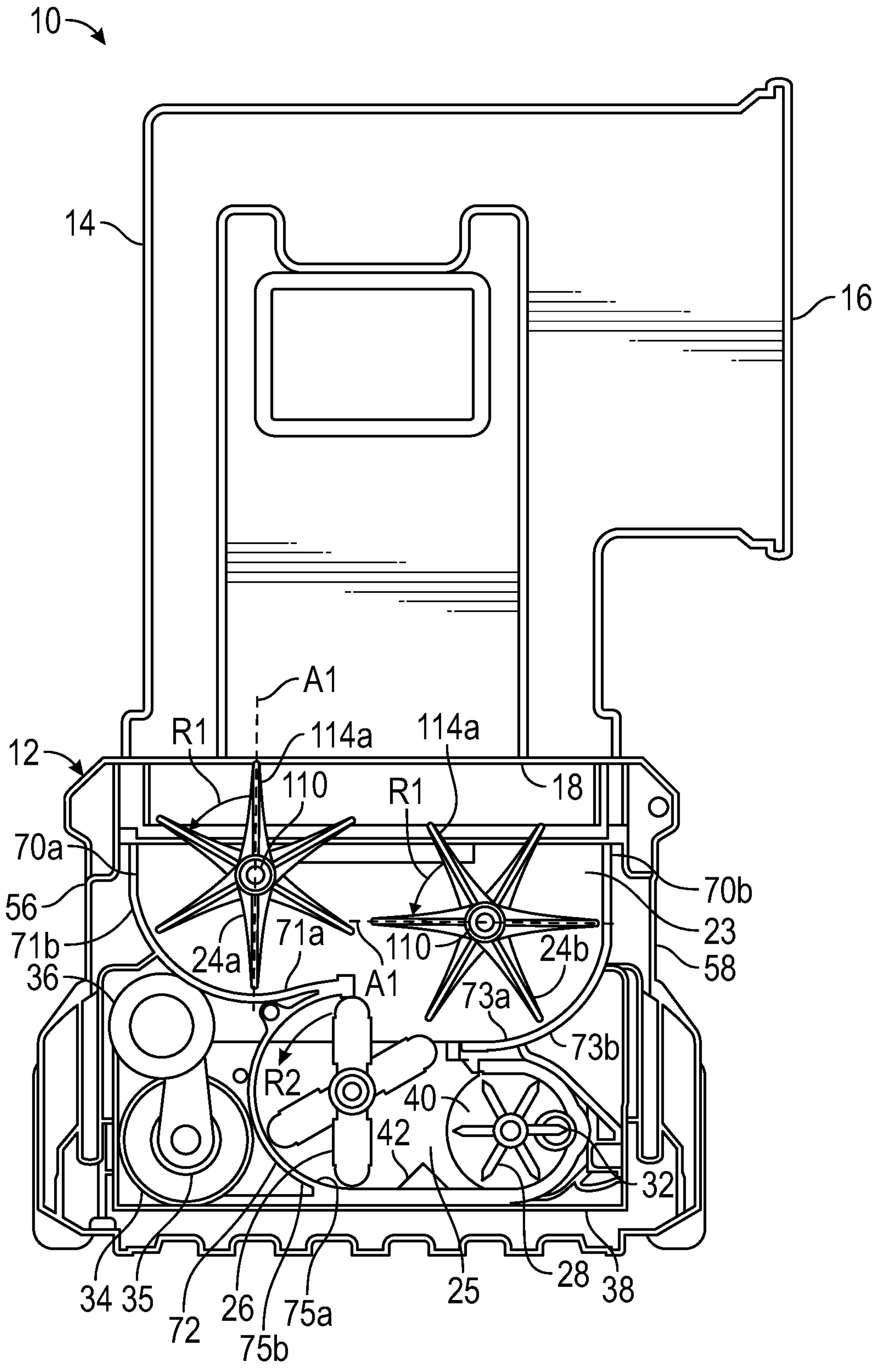
FIG. 3 is a front elevational view, partially in cross-section, of the loosefill insulation blowing machine of FIG. 1.

Referring now to FIGS. 1 and 2, the lower unit 12 includes a front panel 52, a back panel 54, a left side panel 56 and a right side panel 58. In the illustrated embodiment, the panels 52, 54, 56 and 58 are formed from a polymeric material. However, in other embodiments, the panels 52, 54, 56 and 58 can be formed from other desired materials including the non-limiting example of aluminum.

Referring now to FIG. 3, the shredding chamber 23 is mounted at the outlet end 18 of the chute 14. The shredding chamber 23 includes first and second low speed shredders **24*a*, 24*b* and one or more agitators 26. The first and second low speed shredders 24*a*, 24*b* are configured to shred, pick apart and condition the loosefill insulation material as the loosefill insulation material is discharged into the shredding chamber 23 from the outlet end 18 of the chute 14. The agitator 26 is configured to finely condition the loosefill insulation material to a desired density as the loosefill insulation material exits the first and second low speed shredders 24*a*, 24*b*. It should be appreciated that although a quantity of two low speed shredders 24*a*, 24*b* and a lone agitator 26 are illustrated, any desired quantity of low speed shredders 24*a*, 24*b* and agitators 26 can be used. Further, although the blowing machine 10 is shown with first and second low speed shredders 24*a*, 24*b***, any type of separator, such as a clump breaker, beater bar or any other mechanism, device or structure that shreds, picks apart and conditions the loosefill insulation material can be used.

Referring again to FIG. 3, the first and second low speed shredders **24*a*, 24*b* rotate in a counter-clockwise direction R1 and the agitator 26 rotates in a counter-clockwise direction R2. Rotating the low speed shredders 24*a*, 24*b* and the agitator 26 in the same counterclockwise direction allows the low speed shredders 24*a*, 24*b* and the agitator 26 to shred and pick apart the loosefill insulation material while substantially preventing an accumulation of unshredded or partially shredded loosefill insulation material in the shredding chamber 23. However, in other embodiments, each of the low speed shredders 24*a*, 24*b* and the agitator 26 could rotate in a clock-wise direction or the low speed shredders 24*a*, 24*b* and the agitator 26 could rotate in different directions provided the relative rotational directions allow finely shredded loosefill insulation material to be fed into the discharge mechanism 28 while preventing a substantial accumulation of unshredded or partially shredded loosefill insulation material in the shredding chamber 23**.

Referring again to FIG. 3, the agitator 26 is configured to finely condition the loosefill insulation material, thereby forming finely conditioned loosefill insulation material and preparing the finely conditioned loosefill insulation material for distribution into an airstream. In the embodiment illustrated in FIG. 3, the agitator 26 is positioned vertically below the first and second low speed shredders **24*a*, 24*b*. Alternatively, the agitator 26 can be positioned in any desired location relative to the first and second low speed shredders 24***a*, 24*b*, sufficient to receive the loosefill insulation material from the first and second low speed shredders 24*a*, 24*b*, including the non-limiting example of being positioned horizontally adjacent to the first and second low speed shredders 24*a*, 24*b*. In the illustrated embodiment, the agitator 26 is a high speed shredder. Alternatively, the agitator 26 can be any type of shredder, such as a low speed shredder, clump breaker, beater bar or any other mechanism that finely conditions the loosefill insulation material and prepares the finely conditioned loosefill insulation material for distribution into an airstream.

In the embodiment illustrated in FIG. 3, the first and second low speed shredders 24*a*, 24*b* rotate at a lower rotational speed than the rotational speed of the agitator 26. The first and second low speed shredders 24*a*, 24*b* rotate at a rotational speed of about 40-80 rpm and the agitator 26 rotates at a rotational speed of about 300-500 rpm. In other embodiments, the first and second low speed shredders 24*a*, 24*b* can rotate at rotational speeds less than or more than 40-80 rpm and the agitator 26 can rotate at rotational speeds less than or more than 300-500 rpm. In still other embodiments, the first and second low speed shredders 24*a*, 24*b* can rotate at rotational speeds different from each other.

Referring again to FIG. 3, a discharge mechanism 28 is positioned adjacent to the agitator 26 and is configured to distribute the finely conditioned loosefill insulation material exiting the agitator 26 into an airstream. The finely conditioned loosefill insulation material is driven through the discharge mechanism 28 and through a machine outlet 32 by an airstream provided by a blower 34 and associated ductwork (not shown) mounted in the lower unit 12. The blower 34 is mounted for rotation and is driven by a blower motor 35. The airstream is indicated by an arrow 33 in FIG. 4. In other embodiments, the airstream 33 can be provided by other methods, such as by a vacuum, sufficient to provide an airstream 33 driven through the discharge mechanism 28.

Referring again to FIG. 3, the blower motor 35 is illustrated. The blower motor 35 is configured for 120 volt alternating current (A.C.) operation and is sized to require a maximum current of 11.0 amps. Further, the blower motor 35 is of a flow-through type and has a maximum rotational speed in a range of about 30,000 revolutions per minute to about 40,000 revolutions per minute. The blower motor 35 is configured for pulse width modulation control, thereby allowing for fine control and variability in the rotational speed of the blower 34. The variable rotational speed of the blower 34 will be discussed in more detail below.

Referring again to FIG. 3, the first and second shredders 24*a*, 24*b*, agitator 26 and discharge mechanism 28 are mounted for rotation. They can be driven by any suitable means, such as by an electric motor 36, or other means sufficient to drive rotary equipment. Alternatively, each of the first and second shredders 24*a*, 24*b*, agitator 26 and discharge mechanism 28 can be provided with its own source of rotation.

Referring again to FIG. 3, the lower unit 12 includes a first shredder guide shell 70*a*, a second shredder guide shell 70*b* and an agitator guide shell 72. The first shredder guide shell 70*a* is positioned partially around the first low speed shredder 24*a* and extends to form an arc of approximately 90°. The first shredder guide shell 70*a* has an inner surface 71*a* and an outer surface 71*b*. The first shredder guide shell 70*a* is configured to allow the first low speed shredder 24*a* to seal against the inner surface 71*a* of the shredder guide shell 70*a* and thereby urge loosefill insulation material in a direction toward the second low speed shredder 24*b*.

Referring again to FIG. 3, second shredder guide shell 70*b* is positioned partially around the second low speed shredder 24*b* and extends to form an arc of approximately 90°. The second shredder guide shell 70*b* has an inner surface 73*a* and an outer surface 73*b*. The second shredder guide shell 70*b* is configured to allow the second low speed shredder 24*b* to seal against the inner surface 73*a* of the second shredder guide shell 70*b* and thereby urge the loosefill insulation in a direction toward the agitator 26.

In a manner similar to the shredder guide shells, 70*a*, 70*b*, the agitator guide shell 72 is positioned partially around the agitator 26 and extends to form an arc of approximate 90°. The agitator guide shell 72 has an inner surface 75*a* and an outer surface 75*b*. The agitator guide shell 72 is configured to allow the agitator 26 to seal against the inner surface 75*a* of the agitator guide shell 72 and thereby direct the loosefill insulation in a downstream direction toward the discharge mechanism 28.

In the embodiment illustrated in FIG. 3, the shredder guide shells 70*a*, 70*b* and the agitator guide shell 72 are formed from a polymeric material. However, in other embodiments, the shells 70*a*, 70*b* and 72 can be formed from other desired materials including the non-limiting example of aluminum.

Referring again to FIG. 3, the shredding chamber 23 includes a floor 38 positioned below the blower 34, the agitator 26 and the discharge mechanism 28. In the illustrated embodiment, the floor 38 is arranged in a substantially horizontal plane and extends substantially across the lower unit 12. In the embodiment illustrated in FIG. 3, the floor 38 is formed from a polymeric material. However, in other embodiments, the floor 38 can be formed from other desired materials including the non-limiting example of aluminum.

Referring again to FIGS. 1-4, in operation, the inlet end 16 of the chute 14 receives compressed loosefill insulation material. As the compressed loosefill insulation material expands within the chute 14, the chute 14 guides the loosefill insulation material past the outlet end 18 of the chute 14 to the shredding chamber 23. The first low speed shredder 24*a* receives the loosefill insulation material and shreds, picks apart and conditions the loosefill insulation material. The loosefill insulation material is directed by the combination of the first low speed shredder 24*a* and the first shredder guide shell 70*a* to the second low speed shredder 24*b*. The second low speed shredder 24*b* receives the loosefill insulation material and further shreds, picks apart and conditions the loosefill insulation material. The loosefill insulation material is directed by the combination of the second low speed shredder 24*b* and the second shredder guide shell 70*b* to the agitator 26.

Figure 4:
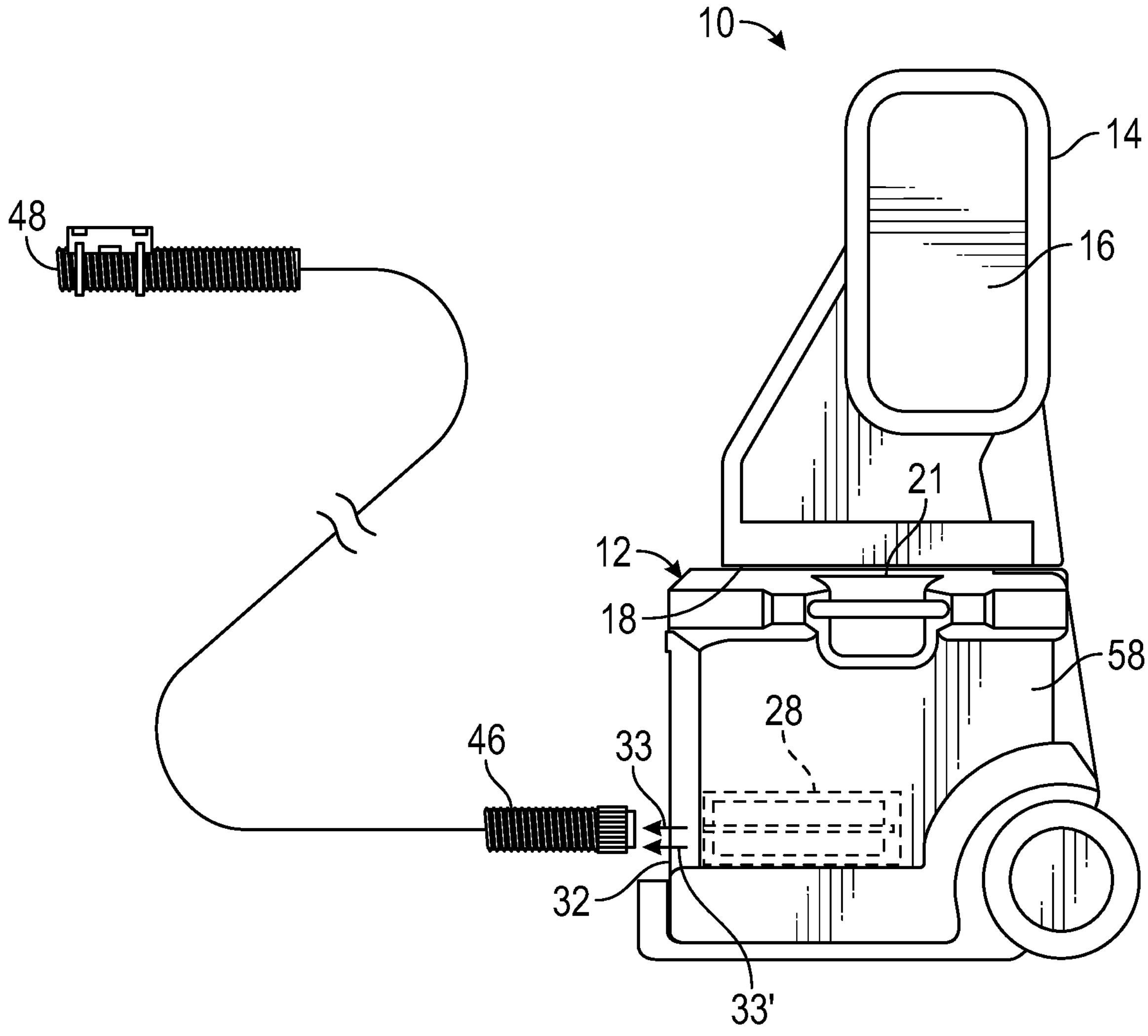
FIG. 4 is a side elevational view of the loosefill insulation blowing machine of FIG. 1, illustrating a distribution hose.

The agitator 26 is configured to finely condition the loosefill insulation material and prepare the loosefill insulation material for distribution into the airstream 33 by further shredding and conditioning the loosefill insulation material. The finely conditioned loosefill insulation material, guided by the agitator guide shell 72, exits the agitator 26 at an outlet end 25 of the shredding chamber 23 and enters the discharge mechanism 28 for distribution into the airstream 33 provided by the blower 34. The airstream 33, entrained with the finely conditioned loosefill insulation material, exits the insulation blowing machine 10 at the machine outlet 32 and flows through a distribution hose 46, as shown in FIG. 4, toward an insulation cavity, not shown.

Referring again to FIG. 3, the discharge mechanism 28 has a side inlet 40 and an optional choke 42. The side inlet

40 is configured to receive the finely conditioned blowing insulation material as it is fed from the agitator 26. In the illustrated embodiment, the agitator 26 is positioned adjacent to the side inlet 40 of the discharge mechanism 28. In other embodiments, the low speed shredders 24*a*, 24*b* or agitator 26, or other shredding mechanisms can be positioned adjacent to the side inlet 40 of the discharge mechanism 28 or in other suitable positions.

Referring again to FIG. 3, the optional choke 42 is configured to partially obstruct the side inlet 40 of the discharge mechanism 28 such that heavier clumps of blowing insulation material are prevented from entering the side inlet 40 of the discharge mechanism 28. The heavier clumps of blowing insulation material are redirected past the side inlet 40 of the discharge mechanism 28 to the shredders 24*a*, 24*b* for recycling and further conditioning.

Referring again to FIG. 4, and as described above, the airstream 33 exits the discharge mechanism 28 with the entrained finely conditioned loosefill insulation material. The airstream 33 is conveyed by the distribution hose 46 until the airstream 33 exits the distribution hose 46 at a hose outlet 48. In certain instances, stray fibers of the finely conditioned loosefill insulation material can become airborne during the distribution process. The presence of these stray fibers in unwanted locations, such as on clothing, can be an unwanted nuisance.

Referring again to FIGS. 3 and 4, following distribution of the finely conditioned loosefill insulation material, the blowing machine 10 can be configured to provide a low velocity airstream 33' without entrained conditioned loosefill insulation material. As discussed above, the blower motor 35 is configured for pulse width modulation control, thereby allowing for fine control and variability in the rotational speed of the blower 34. The low velocity airstream 33' can advantageously be used by a machine user to "blow off" stray fibers from the unwanted locations. Any desired velocity of the low velocity airstream can be used, sufficient to blow off stray fibers from the unwanted locations.

Figure 5:
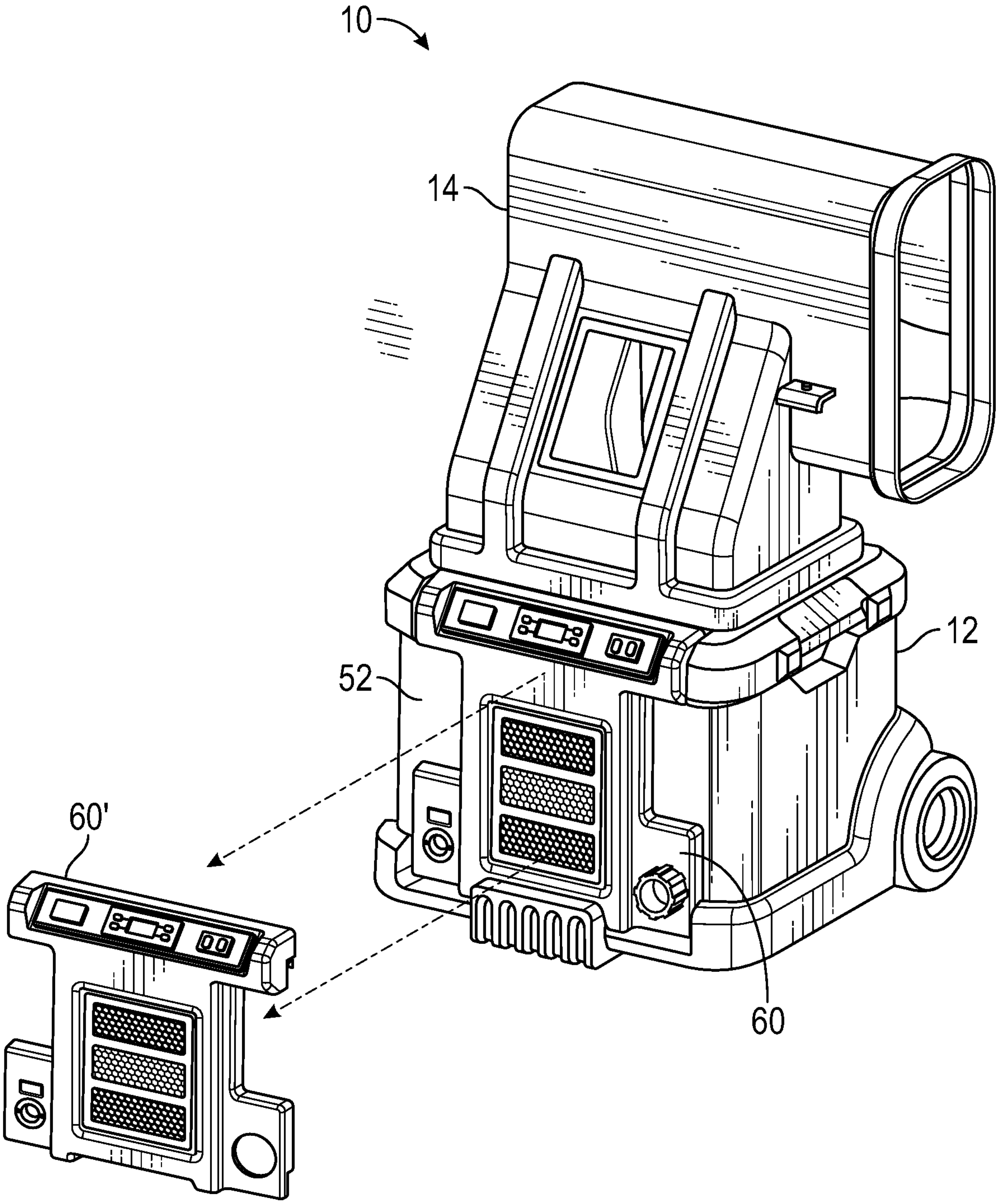
FIG. 5 is an enlarged front view of a portion of the lower unit of FIG. 3 illustrating a removable front access assembly.

Referring now to FIG. 5, the blowing machine 10, lower unit 12 and chute 14 are illustrated. The lower unit 12 includes a removable front access assembly 60. When attached to the front panel 52 of the lower unit 12, the front access assembly 60 is configured to cover a portion of the front panel 52. With the front access assembly 60' removed from the front panel 52, the components located in the lower unit 12, namely the low speed shredders 24*a*, 24*b*, agitator 26, discharge mechanism 28, blower 34 and motor 36 are visible and readily accessible for inspection and maintenance purposes. Advantageously, the removable front access assembly 60 provides for easier inspection and replacement of serviceable devices and parts from a single, front location with minimal machine disassembly.

Referring again to the embodiment illustrated in FIG. 5, the front access assembly 60 is attached to the lower unit 12 with a plurality of clips (not shown). In other embodiments, the front access assembly 60 can be attached to the lower unit 12 with other structures and devices, including the non-limiting example of mechanical fasteners.

Figure 6:
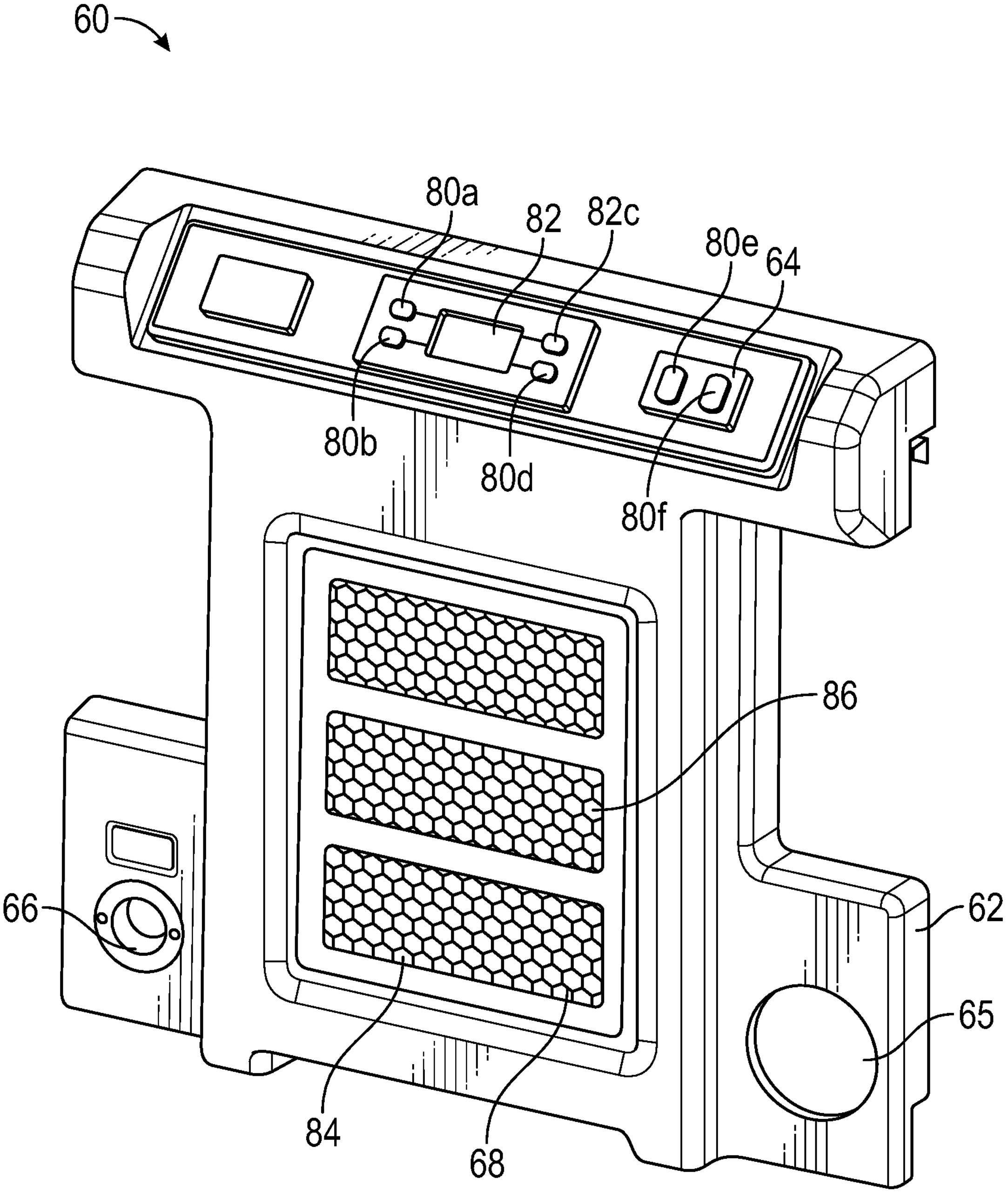
FIG. 6 is a front perspective view of the n enlarged side view of the removable front access assembly of FIG. 5.

Referring now to FIG. 6, the front access assembly 60 includes a framework 62, a control panel 64, a first aperture 65, a second aperture 66 and an inlet assembly 68. The framework 62 is configured to support the control panel 64, first aperture 65, second aperture 66 and the inlet assembly 68. In the illustrated embodiment, the framework 62 is formed from a polymeric material. However, in other embodiments, the framework 62 can be formed from other desired materials including the non-limiting example of aluminum.

Referring again to FIG. 6, the control panel 64 includes a plurality of control devices 80*a*-80*f* configured to direct certain operating characteristics of the blowing machine 10, including functions such as starting and stopping of the motors 35, 36. In the illustrated embodiment, the control devices 80*a*-80*f* are push buttons. In alternate embodiments, the control devices 80*a*-80*f* can be other mechanism or devices, such as the non-limiting examples of switches, knobs, joysticks and the like, sufficient to direct certain operating characteristics of the blowing machine 10.

The control panel 64 further includes a display device 82. The display device 82 is configured to visually display certain operating characteristics of the blowing machine 10. In the illustrated embodiment, the display device 82 has the form of a liquid crystal display (commonly referred to as LCD) and illustrates images in a monochrome format. The LCD-type of display device 82 and the monochrome format advantageously allows operation with low electrical power requirements. While the embodiment of the display device 82 is described as an LCD-type of display, it should be appreciated that other display devices, sufficient to display certain operating characteristics of the blowing machine 10, can be used, such as the non-limiting examples of eInk screens or siPix screens. It should also be appreciated that in other embodiments, color formats can be used in lieu of monochrome formats.

Referring again to FIG. 6, the first aperture 65 is configured to receive and align with the machine outlet 32, as shown in FIG. 3. In the illustrated embodiment, the first aperture 65 has a circular cross-sectional shape corresponding to the circular cross-sectional shape of the machine outlet 32. In other embodiments, the first aperture 65 can have other cross-sectional shapes sufficient to receive and align with the machine outlet 32.

Referring again to FIG. 6, the second aperture 66 is configured to receive and align with an electrical power cord connector (not shown). The power cord connector is configured for connection with an electrical power supply cord. In the illustrated embodiment, the power cord connector is a 110 volt ground fault circuit interrupter with test & reset buttons. Alternatively, the power cord connector can be other mechanisms or structures.

Referring again to FIG. 6, the inlet assembly 68 includes a screen 84 and an associated filter 86. The combination of the screen 84 and the filter 86 is configured as an air inlet, thereby allowing air exterior to the blowing machine 10 to enter and flow through the blowing machine 10. The screen 84 has a plurality of apertures configured to allow an inflow of air. The apertures can have any desired arrangement sufficient to allow an inflow of air. The filter 86 is a fibrous medium configured to allow the inflow of air while removing fine solids from the air flow. In the illustrated embodiment, the filter 86 is a removable and cleanable filter. However, in other embodiments, the filter 86 can be a single use filter sufficient to allow air exterior to the blowing machine 10 to enter and flow through the blowing machine 10.

Figure 7:
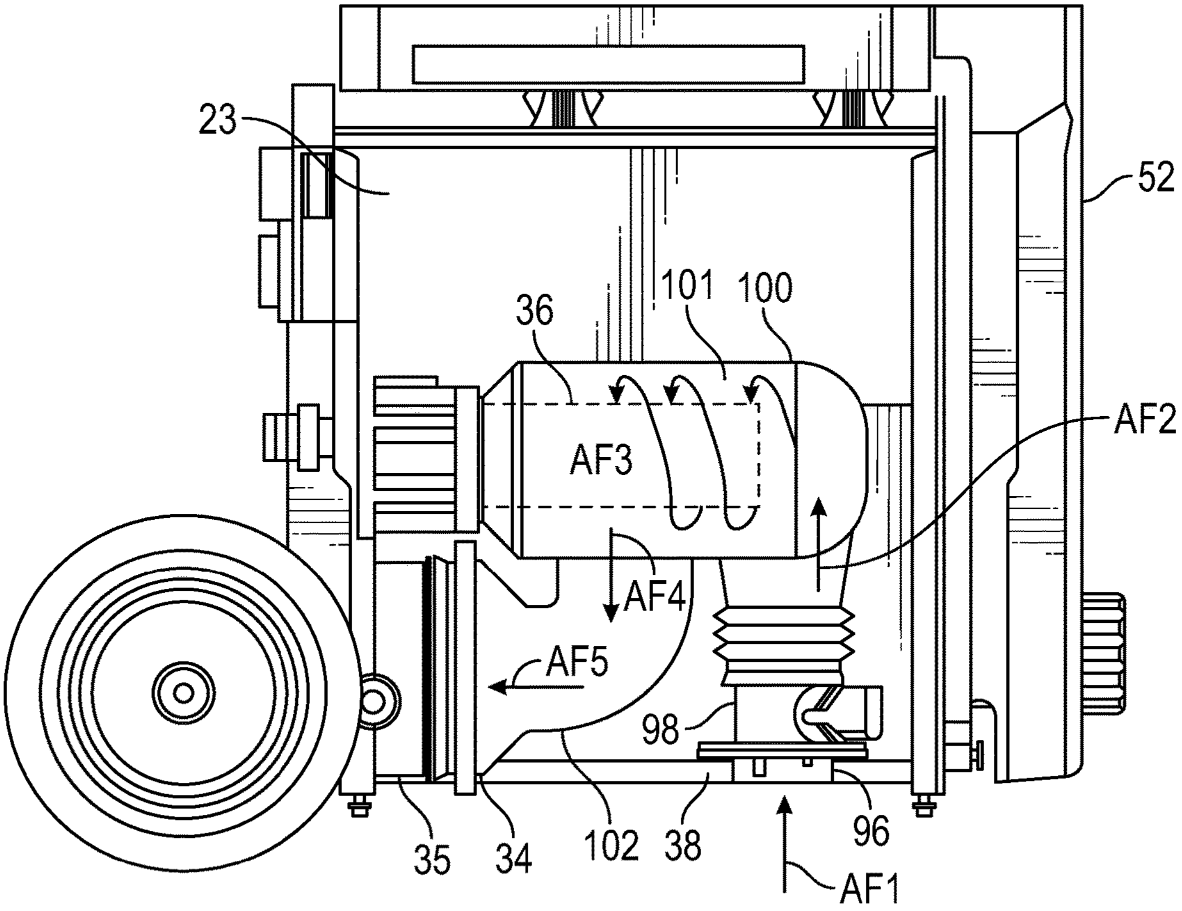
FIG. 7 is side view, in elevation, of the lower unit of the loosefill insulation blowing machine of FIG. 1, illustrating a motor cooling enclosure.

Referring now to FIG. 7, a side view of a portion of the lower unit 12 is illustrated. The blower 34 and the blower motor 35 are positioned adjacent the floor 38. The motor 36 configured to drive certain rotary components, such as for example, the agitator 26, is positioned vertically above the blower 34. A port 96 extends through the floor 38 and is configured as an inlet for a volume of flowing air as shown by direction arrow AF1. The port 96 is fluidly connected to a second ductwork 98 configured as a conduit for the airflow AF1. The second ductwork 98 is fluidly connected to a motor enclosure 100. The motor enclosure 100 is configured to enclose the motor 36. A cavity 101 is formed in a circumferential space between an exterior surface of the motor 36 and an interior circumferential surface of the motor enclosure 100. In the illustrated embodiment, the enclosure 100 has a cylindrical shape corresponding to the generally cylindrical shape of the motor 36. However, the enclosure 100 can have other shapes sufficient to enclose the motor 36 while forming a cavity 101 between an exterior surface of the motor 36 and the interior circumferential surface of the motor enclosure 100. The cavity 91 within the motor enclosure 90 is configured to receive the airflow flowing through the port 96 as indicated by direction arrow AF2.

Referring again to FIG. 7, cavity 101 within the motor enclosure 100 is fluidly connected to a third ductwork 102 extending from the motor enclosure 100 to the blower 34. The third ductwork 102 is configured as a conduit for an airflow, indicated by direction arrow AF4, and can have any desired structure.

In operation, the blower 34 develops a volume of flowing air through the lower unit 12 as described in the following steps. In an initial step, operation of the blower 34 creates a vacuum that extends through the third ductwork 102, the cavity 101 within the enclosure 100 and through the second ductwork 98 to the port 96. The vacuum creates the airflow AF1. The airflow AF1 flows into the port 96, through the second ductwork 98 and into the cavity 101 within the enclosure 100 as indicated by direction arrow AF2. Once in the enclosure 100, the airflow encircles the motor 36, as indicated by direction arrows AF3. The airflow encircles the motor 36 and finally flows through into the third ductwork 102 as indicated by arrow AF4. The airflow continues flowing into the blower 34 as shown by arrow AF5.

Referring again to FIG. 7, the airflow AF3 encircling the motor 36 cools the motor 36. In the illustrated embodiment, the airflow AF3 is in a range of from about 20.0 cubic feet per minute (cfm) to about 110.0 cfm. However, in other embodiments, the airflow AF3 can be less than about 20.0 cfm or more than about 110.0 cfm, sufficient to cool the motor 36.

Referring again to FIG. 7, the airflow AF3 encircling the motor 36 cools the motor 36. In certain embodiments, the cooling function of the airflow AF3 advantageously allows one or more cooling devices, such as for example, an electrically driven cooling fan to be eliminated. Elimination of one or more cooling devices advantageously contributes to the low power requirements of the blowing machine 10. While the embodiment of the cooling airflow AF3 shown in FIG. 7 originates in the port 96 and is conveyed in the second ductwork 98, it should be appreciated that the cooling airflow AF3 can originate in other locations and can be conveyed by other structures.

Figure 8:
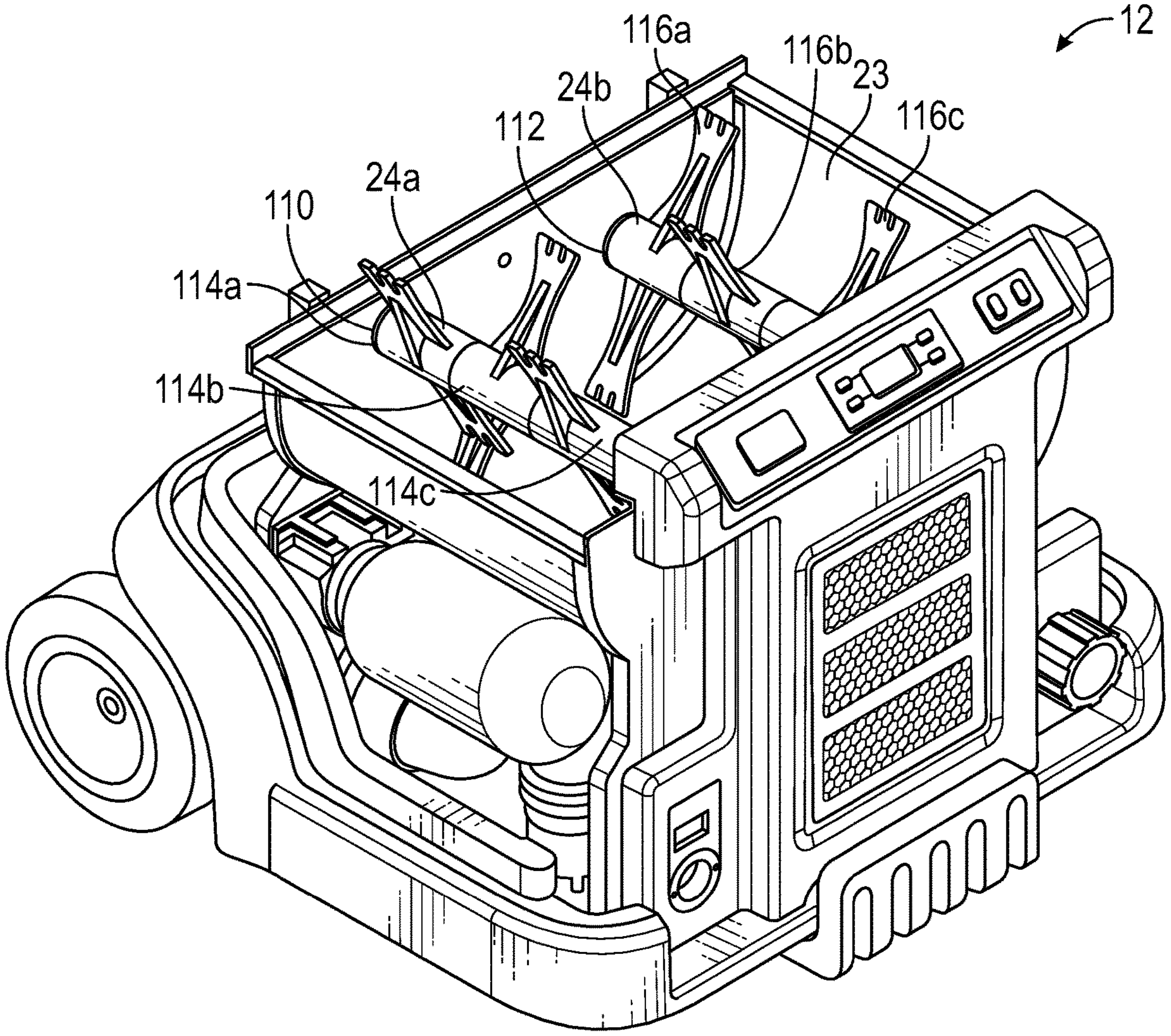
FIG. 8 is a front perspective view of a portion of the lower unit of FIG. 3 illustrating the low speed shredders.

Referring now to FIG. 8, the lower unit 12 is illustrated. As described above, the shredding chamber 23 includes a plurality of low speed shredders 24*a* and 24*b*. Low speed shredder 24*a* includes a first shredder shaft 110 and low speed shredder 24*b* includes an adjacent, second shredder shaft 112. The shredder shafts 110, 112 have a parallel orientation and are configured for rotation within the shredding chamber 23. First shredder shaft 110 is fitted with a plurality of vane assemblies 114*a*-114*d* (although only vane assemblies 114*a*-114*c* are visible in FIG. 8). Similarly, second shredder shaft 112 is fitted with a plurality of vane assemblies 116*a*-116*d* (although only vane assemblies 116*a*-116*c* are visible in FIG. 8). In the illustrated embodiment, each of the shredder shafts 110, 112 is fitted with a quantity of four vane assemblies 114*a*-114*d*, 116*a*-116*d*. However, in other embodiments, each of the shredder shafts 110, 112 can have more or less than four vane assemblies 114*a*-114*d*, 116*a*-116*d*.

Figure 9:
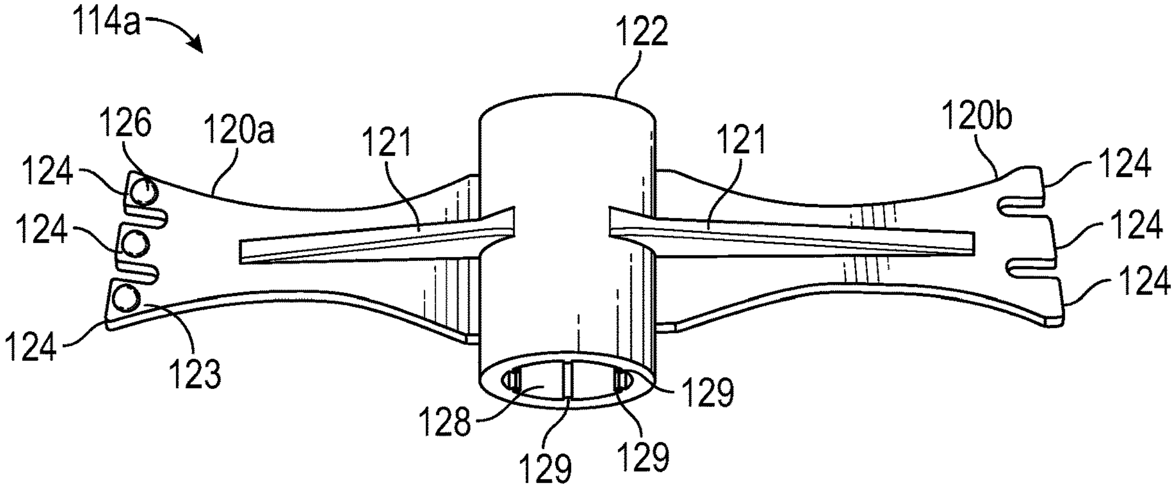
FIG. 9 is a top perspective view of a vane assembly of the lower unit of FIG. 8.

Referring now to FIG. 9, a representative vane assembly 114*a* is illustrated. The vane assembly 114*a* includes opposing blades 120*a*, 120*b*, each extending from and connected to a hub 122. The blades 120*a*, 120*b* are substantially flat members with one or more optional reinforcement gussets 121 positioned on either or both sides of the blades 120*a*, 120*b*. In the illustrated embodiment, the blades 120*a*, 120*b*, hub 122 and gussets 121 are formed as a single, homogenous member. Alternatively, in other embodiments, the blades 120*a*, 120*b*, hub 122 and gussets 121 can be formed as a discrete members connected together.

Referring again to FIG. 9, the blades 120*a*, 120*b* include a plurality of fingers 124, with each finger 124 having one or more optional protrusions 126. The protrusions 126 are configured to assist in the shredding, picking apart and conditioning of the loosefill insulation material. The optional protrusions 126 extend from a first major surface 123 of the fingers 124 in a direction generally perpendicular to the major surface 123 of the fingers 124. In the illustrated embodiment, placement of the protrusions 126 is limited to the first major surface 123 of the fingers 124. However, in other embodiments, placement of the protrusions 126 can occur on both major sides of the fingers 124. It is also within the contemplation of the blowing machine 10 that the fingers 124 can be without protrusions.

Referring again to embodiment illustrated in FIG. 9, the protrusions 126 have a generally rounded cross-sectional shape. However, it should be appreciated that the protrusions 126 can have any desired shape sufficient to assist in the shredding, picking apart and conditioning of the loosefill insulation material. It should also be appreciated that the optional protrusions 126 are not required for operation of the blowing machine 10.

Referring again to FIG. 9, the hub 122 includes an internal passage 128 extending from one end of the hub 122 to the opposing end of the hub 122. A plurality of splines 129 extend from the hub 122 within the internal passage 128. The splines 129 will be discussed in more detail below.

Figure 10:
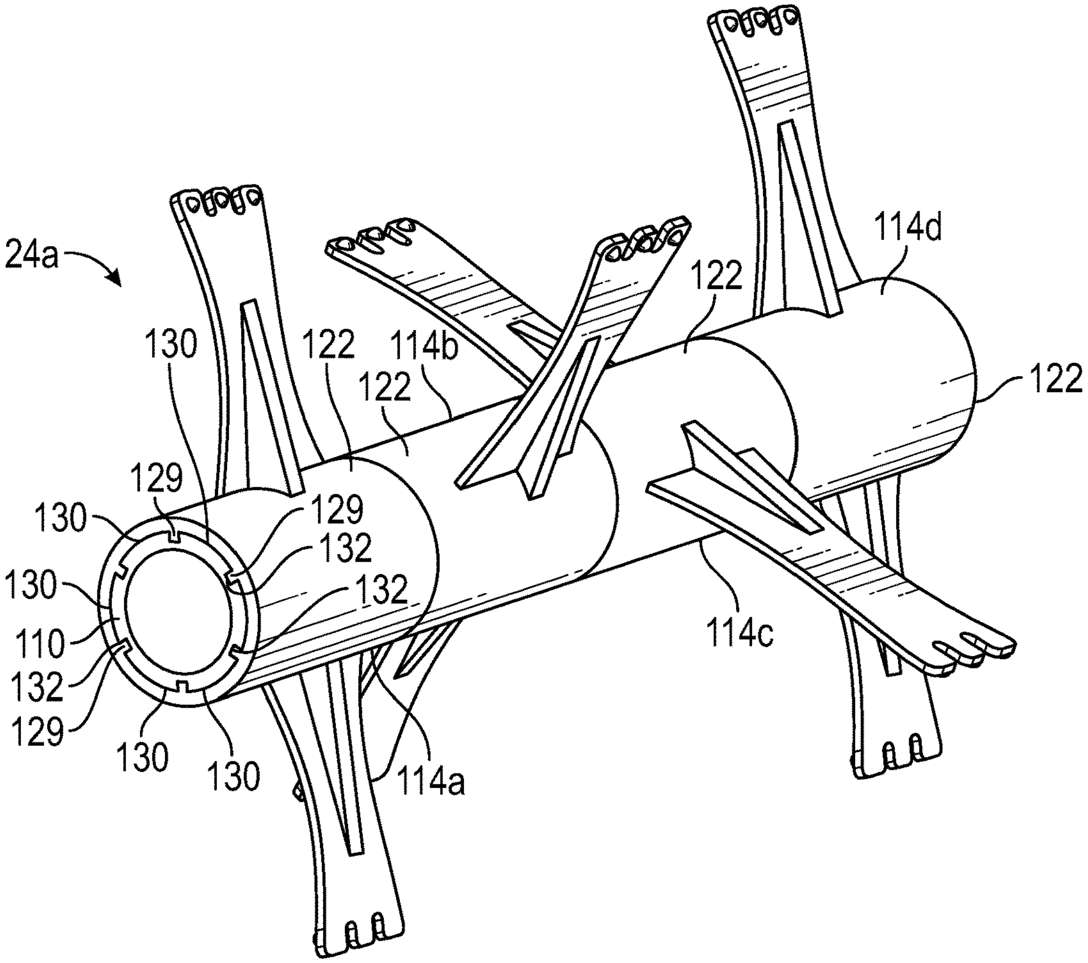
FIG. 10 is a front perspective view of a low speed shredder of the lower unit of FIG. 8.

Referring again to FIG. 9, the vane assemblies 114*a* is made of rubber and has a hardness rating of 60 A to 70 A Durometer. A hardness rating of between 60 A to 70 A Durometer allows the vane assembly 114*a* to effectively grip the loosefill insulation material for shredding while preventing jamming of the loosefill insulation material in the low speed shredders 24*a*, 24*b*. Optionally, the vane assembly 114*a* can have a hardness greater than 70 A Durometer or less than 60 A Durometer. In another embodiment, the vane assembly 114*a* can be made of other materials, such as aluminum or plastic, sufficient to effectively grip the loosefill insulation material for shredding while preventing jamming of loosefill insulation material in the low speed shredders 24*a*, 24*b*. Referring now to FIG. 10, the low speed shredder 24*a* is illustrated. The low speed shredder 24*a* is representative of low speed shredder 24*b*. The low speed shredder 24*a* includes the first shredder shaft 110 and a plurality of vane assemblies 114*a*-114*d*. The first shredder shaft 110 is a hollow rod having a plurality of flat faces 130 spaced apart between a plurality of recesses 132. The flat faces 130 and the recesses 132 extend substantially along the length of the first shredder shaft 110.

Referring again to FIG. 10, the vane assemblies 114*a*-114*d* are mounted to the shredder shaft 110 by sliding the hubs 22 of each vane assembly 114*a*-114*d* onto the flat faces 130 of the shredder shaft 110, such that the recesses 132 receive and mate with the splines 129 extending within the internal passages 128 of the hubs 122. As shown in FIG. 10, the hubs 122 of the vane assemblies 114*a*-114*d* are positioned in an end-to-end arrangement and extend the length of the shredder shaft 110.

Figure 11:
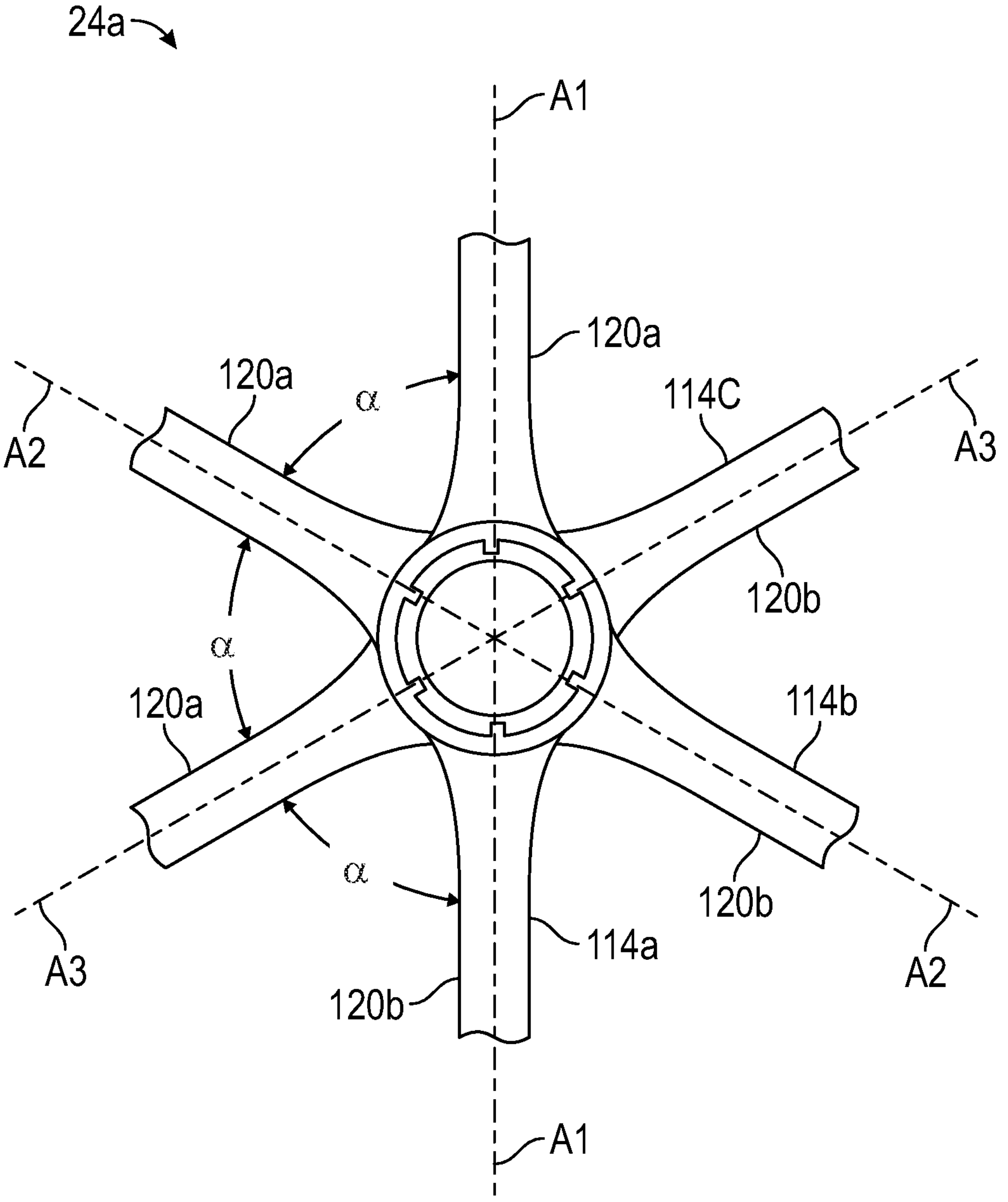
FIG. 11 is a front view of a portion of the low speed shredder of FIG. 10.

Referring now to FIG. 11, the low speed shredder 24*a* includes a plurality of vane assemblies 114*a*-114*d* mounted to the shredder shaft 110 (for purposes of clarity, only vane assemblies 114*a*-114*c* are illustrated. The opposing blades 120*a*, 120*b* of the vane assembly 114*a* have a longitudinal axis A1-A1. Similarly, the opposing blades 120*a*, 120*b* of the vane assembly 114*b* have a longitudinal axis A2-A2 and the opposing blades 120*a*, 120*b* of the vane assembly 114*c* have a longitudinal axis A3-A3. Generally, the vane assemblies are mounted the shredder shaft such that longitudinal axes of the blades of adjacent vane assemblies are offset from each other by an angle α. Offsetting the vane assemblies from each other on the shredder shaft allows the vane assemblies to effectively grip the loosefill insulation material for shredding while preventing jamming of the loosefill insulation material in the shredders. In the embodiment illustrated in FIG. 11, the axes A1-A1, A2-A2 and A3-A3 of the blades 120*a* of adjacent vane assemblies 114*a*-114*d* are offset from each other by an angle α in a range of from about 45° to about 75°. In other embodiments, the angle α of by an angle less than about 45° or more than about 75°, such that the angle α is sufficient to effectively grip the loosefill insulation material for shredding while preventing jamming of the loosefill insulation material in the shredders 24*a*, 24*b*.

Referring again to the embodiment illustrated in FIG. 11, while angle α is described above as being the same between adjacent blades 120*a*, it is within the contemplation of the blowing machine 10 that different angles can be used between adjacent vane assemblies.

Referring again to FIG. 3, the vane assemblies 114*a* of the low speed shredders 24*a*, 24*b* are illustrated. The low speed shredder 24*a* includes a shredder shaft 110 and vane assemblies 114*a*-114*d*. Similarly, the low speed shredder 24*b* includes a shredder shaft 110 and vane assemblies 114*a*-114*d*. The vane assembly 114*a* of low speed shredder 24*a* has the longitudinal axis A1-A1 and the vane assembly 114*a* of low speed shredder 24*b* has the longitudinal axis A1'-A1'. As shown in FIG. 3, the vane assemblies on a shredder shaft generally align with the vane assemblies on the adjacent shredder shaft in a substantially perpendicular orientation, since they rotate in the same vertical plane. As one example, the longitudinal axis A1-A1 of the vane assembly 114*a* of low speed shredder 24*a* generally aligns with the longitudinal axis A1'-A1' of the vane assembly 114*a* of low speed shredder 24*b* in a substantially perpendicular orientation. Similarly, the remaining vane assemblies 114*b*-114*d* of the low speed shredder 24*a* have longitudinal axis that are arranged to be substantially perpendicular to the vane assemblies 114*b*-114*d* of the low speed shredder 24*b*. The perpendicular alignment of the corresponding vane assemblies 114*a*-114*d* and allows the low speed shredders 24*a*, 24*b* to effectively shred and pick apart the blowing insulation material and prevent heavy clumps of blowing insulation material from moving past the shredders 24*a*, 24*b* into the agitator 26, thereby preventing an accumulation of blowing insulation material in the shredding chamber 23.

Referring again to the embodiment shown in FIGS. 3, 8 and 10, the low speed shredders 24*a*, 24*b* are identical for ease of replacement. It is to be understood that in other embodiments the low speed shredders 24*a*, 24*b* can be different from each other.

The principle and mode of operation of the loosefill insulation blowing machine have been described in certain embodiments. However, it should be noted that the loosefill insulation blowing machine may be practiced otherwise than as specifically illustrated and described without departing from its scope.

What is claimed is:

1. A machine for distributing loosefill insulation material, the machine comprising a lower unit, the lower unit having:

a front panel;

a shredding chamber bounded on one side by the front panel, the shredding chamber receiving compressed loosefill insulation material from a source of compressed loosefill insulation material, the shredding chamber including a plurality of shredders for shredding, picking apart, and conditioning the loosefill insulation material;

a discharge mechanism mounted to receive the conditioned loosefill insulation material exiting the shredding chamber and to distribute the conditioned loosefill insulation material into an airstream; and a removable front access assembly covering a portion of the front panel of the lower unit, wherein the removable front access assembly includes a control panel having a plurality of control devices;

wherein removal of the removable front access assembly makes the plurality of shredders and the discharge mechanism within the lower unit accessible for inspection, replacement, or repair.

2. The machine of claim 1, wherein the removable front access assembly further includes at least one of a screen and a filter.

3. The machine of claim 2, wherein removal of the removable front access assembly further makes the filter accessible for inspection, cleaning, and replacement.

4. The machine of claim 1, wherein the control devices of the control panel are configured to operate at least one characteristic of the machine.

5. The machine of claim 1, wherein the removable front access assembly includes a display configured to visually show operating characteristics of the machine.

6. The machine of claim 1, wherein the removable front access assembly includes a first aperture configured to receive a machine outlet.

7. The machine of claim 1, wherein the removable front access assembly includes a second aperture configured to receive an electrical power cord connector.

8. The machine of claim 1, further comprising a chute having an inlet end and an outlet end.

9. The machine of claim 1, wherein the lower unit comprises a blower upstream of the discharge mechanism and providing the airstream flowing through the discharge mechanism.

10. The machine of claim 9, wherein when the removable front access assembly is removed from the lower unit, the blower is accessible for inspection, replacement, or repair.

* * * * *